United States Patent [19]
Buchwald

[11] 3,781,033
[45] Dec. 25, 1973

[54] VEHICLE HEIGHT ADJUSTING SUSPENSION ARRANGEMENT

[75] Inventor: Robert M. Buchwald, Birmingham, Mich.

[73] Assignee: General Motors Corporation, Detroit, Mich.

[22] Filed: Nov. 8, 1972

[21] Appl. No.: 304,767

[52] U.S. Cl............... 280/124 R, 267/60, 267/61 S
[51] Int. Cl............................................. B60g 11/16
[58] Field of Search.................. 280/124 R; 267/60, 267/61 R, 61 S

[56] References Cited
UNITED STATES PATENTS

| | | | |
|---|---|---|---|
| 3,091,448 | 5/1963 | Kieffer | 267/60 |
| 3,674,250 | 7/1972 | Joseph | 267/61 S |
| 2,697,600 | 12/1954 | Gregoire | 267/61 |

*Primary Examiner*—Philip Goodman
*Attorney*—W. E. Finken et al.

[57] ABSTRACT

Suspension systems for automotive vehicles of the type employing primary coil suspension springs between the sprung and unsprung masses are adapted for adjustment of the local suspension height and vehicle attitude or trim by including at either or both of the front and rear suspensions lower spring seats having one surface engaged by the lower end of the coil spring and an opposite surface having several pairs of parti-cylindrical seat faces complementary to the supporting axle housing or the like, the seats being rotatable to different orientations on the axle to select different amounts of elevation of the lower end of the spring.

4 Claims, 7 Drawing Figures

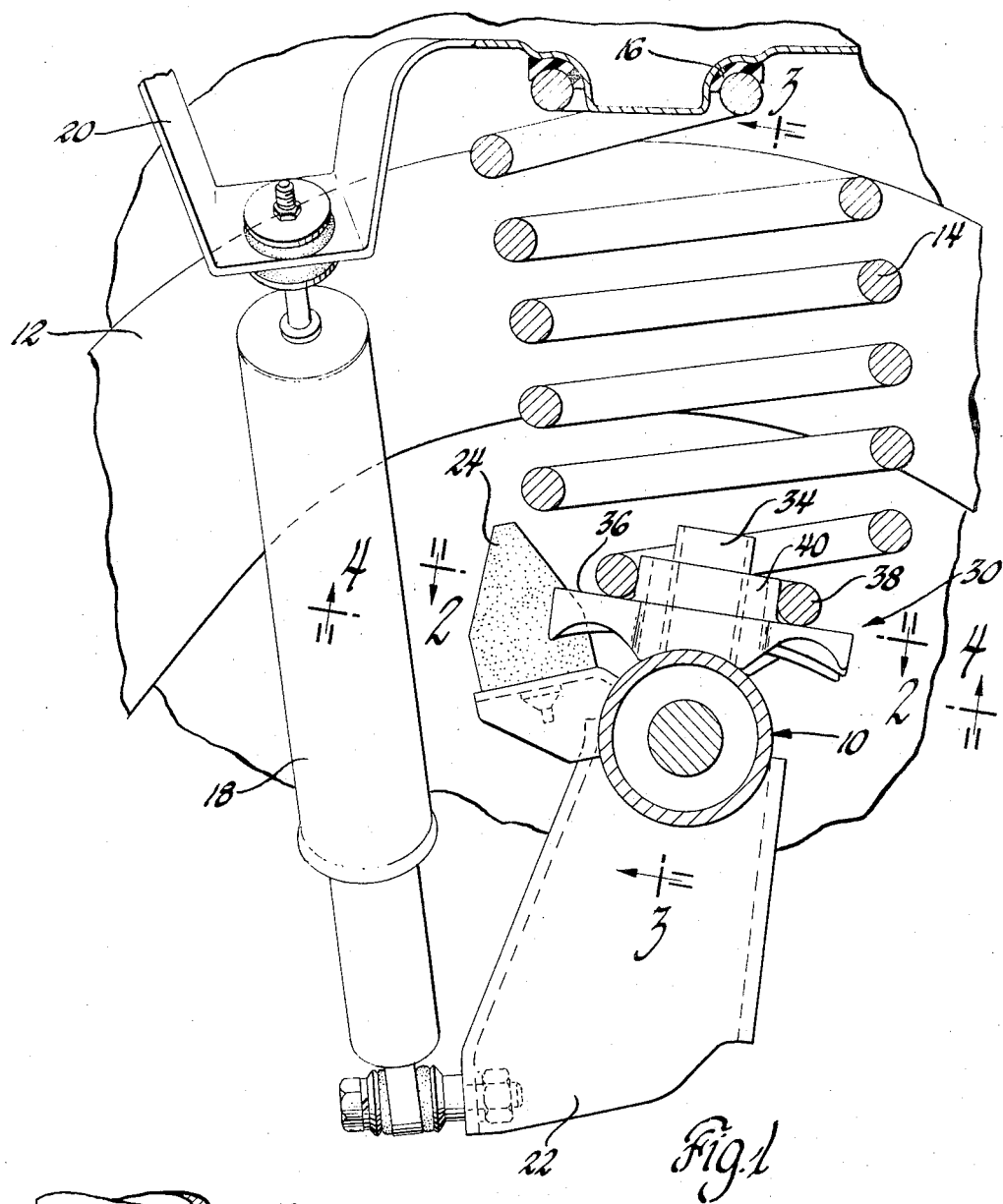
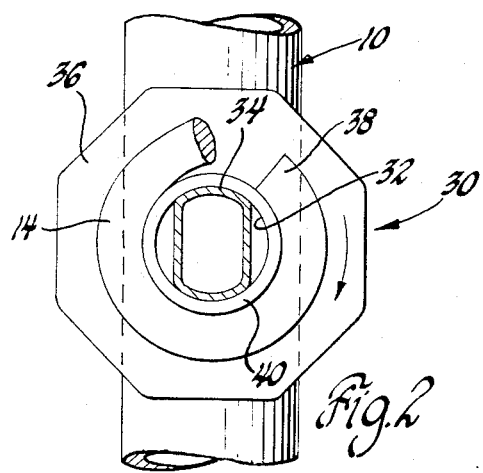
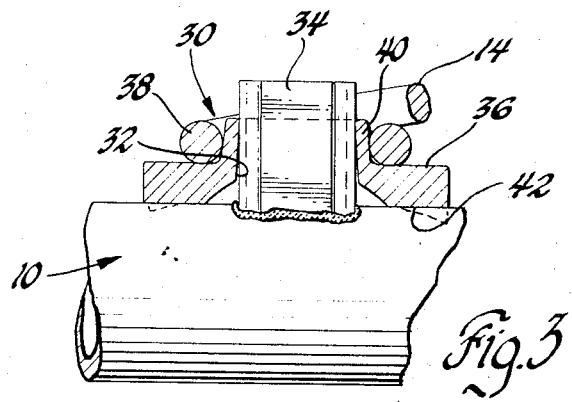

VEHICLE HEIGHT ADJUSTING SUSPENSION ARRANGEMENT

This invention relates to automotive vehicle suspensions and more particularly to such suspensions wherein adjustment of the vehicle height and trim or attitude may be readily effected.

The present invention provides, particularly, a vehicle height and attitude adjusting arrangement directed for use with the well-known type of automotive suspensions employing a coil primary suspension spring compressively interengaged between spring seats on the sprung and unsprung masses of the vehicle. As is well-known, the design of the suspension elements typically includes selection of the standing height and rate of the several primary coil springs properly to accomplish as perfectly level an attitude to the vehicle as can be, and this in view of the various loads and fore and aft load distributions the vehicle will experience.

The present invention has as its principal feature the arrangement within such a vehicle suspension of a special combined spring seat and vehicle height and attitude adjusting member which takes the place of the ordinary spring seat welder or otherwise associated with, for example, the rigid rear axle element of the suspension, such special spring seat member being adapted for manipulation to various positions on the axle to effect adjustment of the location of the lower end of the coil spring to various heights above the road, thereby adjusting the vehicle height and attitude to account for unsatisfactory conditions of the latter in ways easier than changes of springs, etc., could afford.

A further feature of the invention is the provision in such a spring and height adjusting member of a plurality of pairs of seating surfaces of parti-cylindrical conformation complementary to the usual cylindrical shape of a rigid rear axle so as to be firmly engageable with the latter in any adjusted position of the seat and thus not requiring special designs or shapes in the involved regions of the axle itself.

Yet other features of the invention relate to the piloting of the seat member on the axle for guided rotation thereon when adjusting the vehicle height.

These and other features and advantages of the invention will be more readily apparent from the following specification and the drawings wherein:

FIG. 1 is a partially broken away fragmentary elevational view of a vehicle suspension including the height adjusting arrangement of this invention;

FIG. 2 is a view taken generally along the plane indicated by lines 2—2 of FIG. 1;

FIG. 3 is a sectional view taken generally along the plane indicated by lines 3—3 of FIG. 1;

Figure 4:
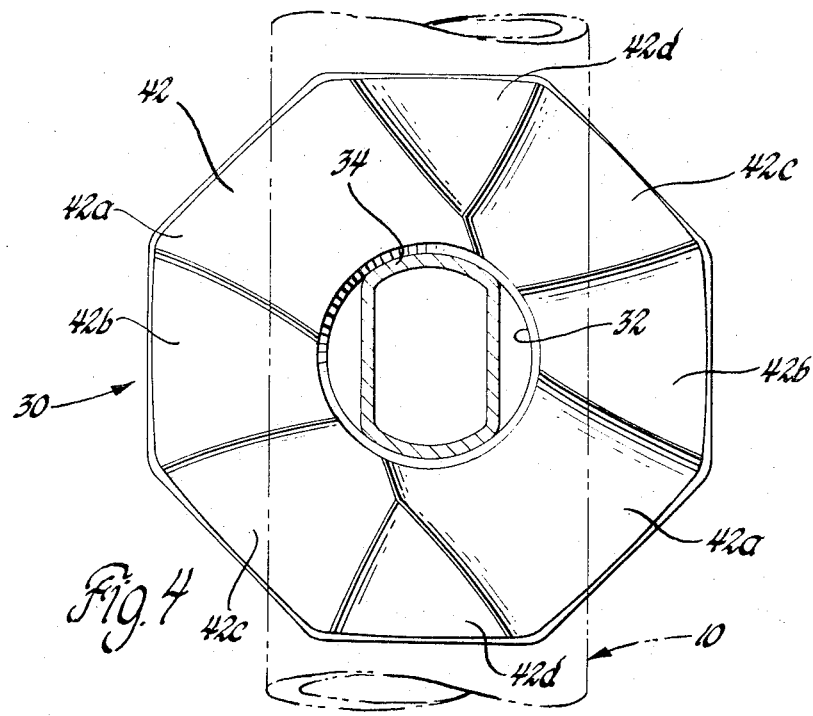
FIG. 4 is an enlarged view taken generally along the plane indicated by lines 4—4 of FIG. 1.

Referring now particularly to FIG. 1 of the drawings, illustrated there is a rear suspension system for automotive vehicles of generally conventional type employing a live rigid rear axle supporting the rear driven road wheels of the vehicle. It is of course to be appreciated that this illustrative rear suspension arrangement is also equally well employed in front suspension of vehicles with or without live driving means located within the axle for the road wheels.

In any case, the axle indicated at 10 is of the type embodying a cylindrical tubular housing extending transversely of the vehicle to support the spaced pair of road wheels, the total such assembly together with motion control arms, not shown, constituting the unsprung mass of the vehicle rear suspension portion. The sprung mass generally includes a body, not shown, and a frame indicated at 12 supported above the axle 10 by a pair of primary coil suspension springs 14, only one of which is shown. The spring 14 is adapted for compressive interengagement between an upper isolation type spring seat 16 on the body or frame at one end, and the axle 10 at the other end. A shock damping strut or shock absorber 18 is interconnected between the sprung and unsprung masses in conventional fashion as between a bracket 20 on the body and a bracket 22 fixed to the axle 10 by welding or otherwise. A bump stop pad 24 of rubber or the like is affixed in suitable manner to axle 10 to engage with the frame 12 under severe ride motion excursions between the two masses and limit the extent of such excursions.

A lower spring seat member 30 having provisions for both retaining the lower end of the coil spring 14 and affording vehicle height and trim adjustment in accordance with the invention, is associated with axle 10. Seat member 30 is of a generally flat circular conformation and, as seen best in FIG. 5, is centrally bored at 32 to receive an upstanding pilot tube 34 or like member of cylindrical shape affixed by welding or other manner to the upper region of the cylindrical axle 10. As indicated in FIG. 4, the pilot tube may be partially flatted on two sides to enhance manual rotation of the seat member, later to be described, yet is closely sized at its outer diameter to the dimension of the bore 32 to closely guide and restrain the position of the seat member firmly on the axle concentric to the axis of revolution of the pilot tube which extends generally vertically of the axle 10.

The seat member defines a first generally level spring supporting surface 36 upon which the lower end 38 of the spring 14 rests. Instead of being fully level, the surface could, of course, include an annular depression sized to receive the lower spring end 38 convolution for retention of the same. As illustrated, however, the supporting surface 36 merges with an upstanding hub like portion 40 of the seat member which is sized closely in diameter to the inner diameter of the convolution of lower spring end 38 thereby to provide retention.

Figure 5:
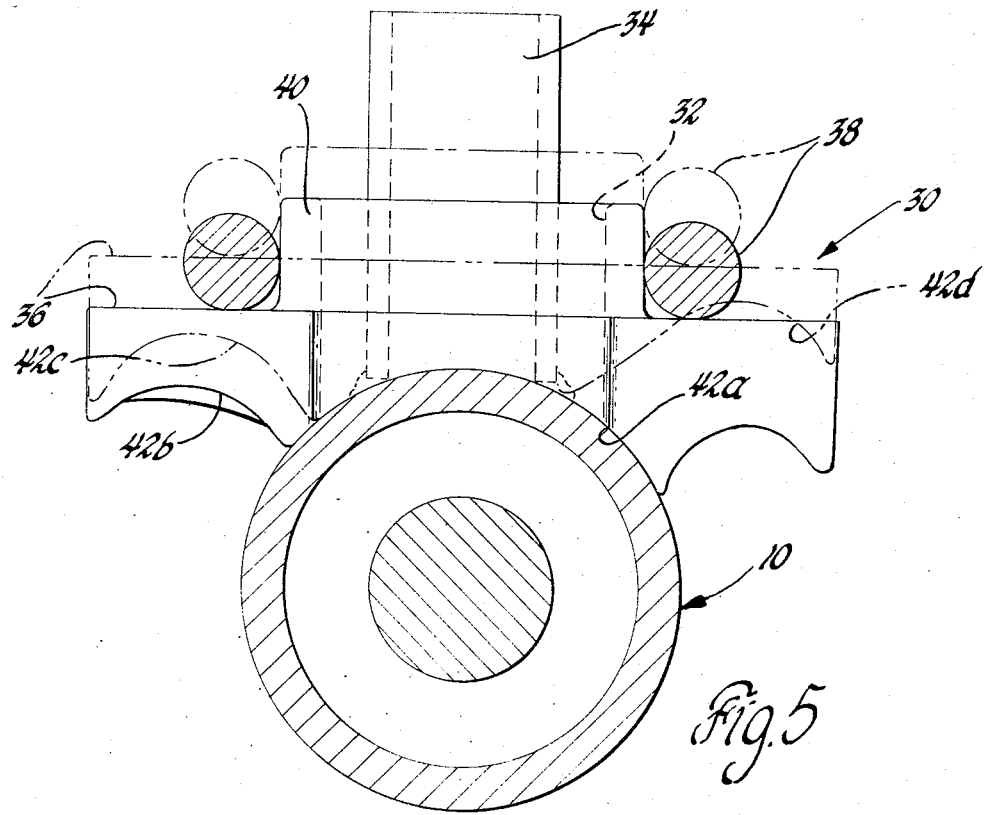
FIG. 5 is an enlarged view of a portion of FIG. 1 indicating two adjustment modes in the spring seat member.

As also indicated in FIG. 4, the seat member 30 further defines a lower height adjusting surface 42 comprised of several pairs of parti-cylindrical seating faces, the two diametrically opposed faces of each pair being identically formed complementary to varying portions of the cylindrical outer surface of axle 10. In this way, each pair of such faces form a durable accurately formed means of transferring forces between the spring 14 and axle 10 without any highly concentrated load bearing regions in such engagement tending toward fatigue or deformation of either the spring seat or the axle. This is true even without the need for any special accommodating design changes to the usual cylindrical shape of the axle 10.

Thus, in the specific embodiment in the Figures and particularly FIG. 4, the lower surface 42 of the seat member 30 comprises four diametrically opposed pairs of seat faces 42a, 42b, 42c and 42d. These pairs of seat faces are formed progressively further removed or spaced, in the direction of the axis of the seat member, from the spring supporting surface 36 thereof. Seat face pair 42a constitute the load bearing surfaces most closely spaced to support surface 36, this spacing being progressively increased through seat face pairs 42b and 42c to the seat face pair 42d which are spaced furthest from such surface. Otherwise viewed, the spring seat member is progressively thicker along the axis of pilot tube 34 when viewing from seat faces 42a around to seat faces 42d and, as seen in FIG. 1, this represents successively greater spacing obtainable between axle 10 and the lower end of spring 38.

Accordingly, the various orientations which the seat member 30 may take angularly about pilot tube 34, thus to engage any selected one of the various pairs of seat faces on axle 10 as shown in FIG. 1, will when done conjointly with similar adjustment of the other spring 14 effect adjustment of the height of the rear portion of the vehicle body and frame above axle 10.

This adjustment of vehicle height may readily be accomplished by, for example, lifting the vehicle at its wheels as by a hoist or hydraulic lift, placing supports under the body and then lowering the wheels of the axle 10 until all compressive stress is removed from springs 14. The spring seat members 30 may then be manually rotated on pilot tubes 34 to provide either greater or lesser spacing of support surface 36 from the axle 10 by orientation of the appropriate seat faces into the upper engaging regions of the axle. The reverse sequence will then again load the springs between their seats and the spring lower ends 38 are snugly retained at hub portions 40 as are the upper ends of the springs on upper seats 16.

The lower seat member 30 shown in FIGS. 1 through 5 may be fabricated by casting, forging, sintering, etc., as a generally solid article but it should also be appreciated that perhaps a more economical fabrication of such a member may be by stamping where the various seat faces are formed in an annular flange struck axially from a main portion forming the support surface 36 and the hub portion 40.

It will of course be understood that the vehicle height adjustment and trim or attitude adjustment of the vehicle may be accomplished by the provision of such a spring seat member arrangement as just described in not only the rear axle and suspension portion of the vehicle but in the front suspension as well, or in both the front and rear suspensions.

Figure 6:
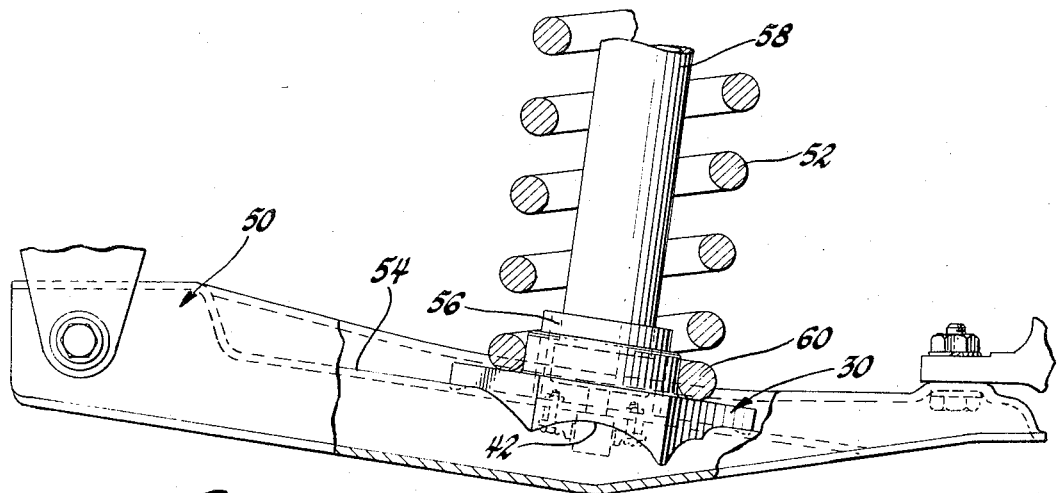
FIG. 6 is a partially sectioned fragmentary elevational view of a vehicle suspension illustrating a modification of the invention.
Figure 7:
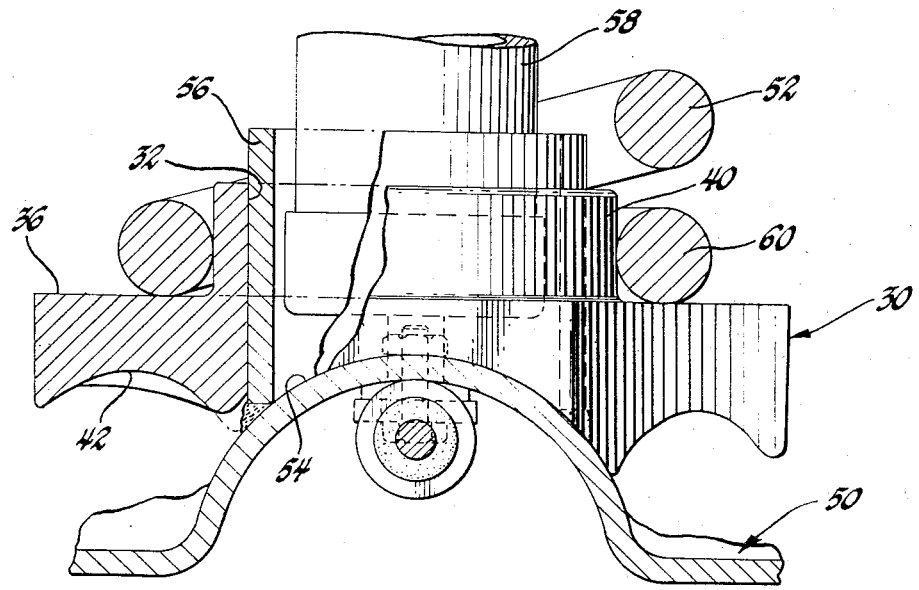
FIG. 7 is an enlarged sectional view taken generally along the plane indicated by lines 7—7 of FIG. 6.

In FIGS. 6 and 7 there is illustrated a modification of the invention in the environment of a typical automotive vehicle front suspension including at either vehicle side the lower control arm element, indicated at 50, of transversely extending parallel arm linkages of well-known character. As is known, the primary coil suspension spring for such front suspensions, indicated at 52, is generally compressively engaged between such lower control arm and an upper seat on the vehicle frame or body. In this case, again, the vehicle height adjustment arrangement may be accomplished with the same special seat members by the provision of a stamped parti-cylindrical load bearing surface 54 in the upper face of the control arm 50, this being best viewed in FIG. 7. Such load surface may best be formed as a longitudinally extending rib or stiffened portion of the control arm affording adequate space laterally of the control arm between such rib and further upwardly extending stiffening flanges to accommodate the installation and rotation therewithin of a height adjusting spring seat member.

Again, an upstanding pilot tube 56 is welded to this load surface 54 and is made sufficiently large in diameter to accept within its interior the usual shock absorber strut 58 for attachment at its lower end to control arm 50 by the usual means. The spring seat member 30 is again received over the pilot tube 56 and engages a selected pair of parti-cylindrical seat faces formed on the lower surface thereof, on the load surface 54. Various amounts of spacing between the lower end 60 of spring 52 and the control arm may be accomplished in the manner above described, including the manual rotation of the spring seat member about the pilot tube axis to some other selected angular position engaging a different set of seat faces on the load surface 54.

It will be recognized that the advantages of a particylindrical conformation to the various seat faces has not the same importance in a front suspension installation as it does in the illustrated typical rear suspension where an objective is to avoid alteration to the usual cylindrical shape of the rear axle housing. Thus, other than cylindrical based shapes may be equally useful for the lower height adjusting surface 42 and for the load surface 54.

Having thus described the invention, what is claimed is:

In the claims:

1. In vehicle suspension for automotive vehicles including sprung and unsprung masses and a coil primary suspension spring interposed therebetween, said unsprung mass including a tubular axle, a vehicle height adjusting spring seat member mounted rotatably on said axle and interposed between one end of said spring and the outer surface of said tubular axle, said spring seat including a first generally level surface engaging said end of said spring, said spring seat further including an opposite surface engageable with said outer surface of said axle and including at least two pairs of load supporting seat faces each face of each pair being formed complementary to only a portion of said outer surface of said axle, said pairs of seat faces being spaced by predeterminedly different amounts from said first surface of said seat whereby rotation of said seat effecting engagement between a selected one of said pairs of seat faces on said axle effects a selected one of varying amounts of height adjustment of said one end of said spring relative to said axle.

2. The combination recited in claim 1, said tubular axle further including an upstanding pilot defining an axis, said seat member being centrally bored and receiving said pilot for rotation of said seat member about said axis.

3. In vehicle suspension for automotive vehicles including sprung and unsprung masses and a coil primary suspension spring interposed therebetween, said unsprung mass including a cylindrically tubular axle, a vehicle height adjusting spring seat member mounted rotatably on said axle and interposed between one end of said spring and the outer cylindrical surface of said axle, said spring seat including a first generally level surface engaging said end of said spring, said spring seat further including an opposite surface engageable with said outer tubular surface of said axle and including at least two pairs of load supporting seat faces each face of each pair being formed parti-cylindrical complementary to a portion of said outer cylindrical surface of said axle, said pairs of seat faces being spaced by predeterminedly different amounts from said first surface of said seat whereby rotation of said seat effecting engagement between a selected one of said pairs of seat faces on said axle effects a selected one of varying amounts of height adjustment of said one end of said spring relative to said axle.

4. In vehicle suspension for automotive vehicles including sprung and unsprung masses and a coil primary suspension spring adapted to be interposed therebetween, said unsprung mass including a road-wheel supporting member, means defining on said supporting member a cylindrical load surface, an upstanding pilot extending from said load surface and defining an axis, a vehicle height adjusting spring seat member centrally bored and receiving said pilot so as to be rotatable thereon about said axis, said seat member being compressively interengaged between one end of said spring and said load surface, said seat member including a first generally level surface engaging said end of said spring, said seat member further including an opposite surface engageable with said load surface and including a plurality of pairs of load supporting seat faces each face of each pair being formed parti-cylindrical complementary to at least a portion of said load surface, said pairs of seat faces being spaced by predeterminedly different amounts from said first surface of said seat member whereby rotation of said seat member effecting engagement between a selected one of said pairs of seat faces on said axle effects a selected one of varying amounts of height adjustment of said one end of said spring relative to said axle.

* * * * *